United States Patent
Shih

[19]

[11] Patent Number: 6,152,473
[45] Date of Patent: Nov. 28, 2000

[54] FOLDING COLLAPSIBLE BABY TRICYCLE

[76] Inventor: Wen Fu Shih, No. 128, Chung I Road, Jen Te Hsiang, Tainan Hsien, Taiwan

[21] Appl. No.: 09/353,540

[22] Filed: Jul. 14, 1999

[51] Int. Cl.[7] ......................................................... B62K 1/00
[52] U.S. Cl. .............................. 280/278; 280/62; 280/287
[58] Field of Search ................................... 280/278, 282, 280/287, 87.05, 62, 639, 642, 7.15; 180/208

[56] References Cited

U.S. PATENT DOCUMENTS

| 4,202,561 | 5/1980 | Yonkers | 280/278 |
| 4,457,529 | 7/1984 | Shamie et al. | 280/278 |
| 4,460,191 | 7/1984 | Ishibashi et al. | 280/287 |
| 4,460,192 | 7/1984 | Takamiya et al. | 280/287 |
| 4,844,494 | 7/1989 | Blanchard | 280/287 |
| 5,186,482 | 2/1993 | Sapper | 280/278 |

FOREIGN PATENT DOCUMENTS

| 2801924 | 8/1978 | Germany | 280/278 |

*Primary Examiner*—Daniel G. DePumpo
*Attorney, Agent, or Firm*—Pro-Techtor International Services

[57] ABSTRACT

A baby tricycle, which includes a head unit holding a pair of handlebars, a front wheel, and a pair of pedals, a body unit having a seat frame, a saddle mounted on the seat frame, and a rear wheel frame holding a pair of rear wheels, and a folding collapsible connecting frame unit coupled between the head unit and the body unit, the folding collapsible connecting frame unit including rear tubular connecting rod having a rear end welded to the rear wheel frame of the body unit and a front end pivoted to the rear end of the seat frame, a link, and a front locating frame, the front locating frame having a front end fixedly connected to the head unit and a rear end coupled to the front end of the rear tubular connecting rod by the link and a coupling portion on the middle pivoted to the front end of the seat frame.

2 Claims, 6 Drawing Sheets

6,152,473

FOLDING COLLAPSIBLE BABY TRICYCLE

BACKGROUND OF THE INVENTION

The present invention relates to baby tricycles, and more particularly to a folding collapsible baby tricycle that can be conveniently collapsed when not in use.

A baby tricycle is a child's vehicle with three wheels moved by the feet. When exercising, the parents may help the child ride a baby tricycle. However, regular baby tricycles are commonly not collapsible. They occupy much storage space when not in use. FIG. 1 shows a baby tricycle according to the prior art. As illustrated, the baby tricycle comprises a head unit 10 holding a pair of handlebars 11, a front wheel 13 and a pair of pedals 12, a rear wheel frame 16 holding a pair of rear wheels 17, a main shaft 14 fixedly connected between the head unit 10 and the rear wheel frame 16, and a saddle 15 mounted on the main shaft 14. When riding the baby tricycle, the child holds the handlebars 11 with the hands, and pedals the pedal 12 with the feet, thereby causing the baby tricycle to move forwards. Because the front and rear ends of the main shaft 14 are respectively welded to the head unit 10 and the rear wheel frame 16, the whole structure of the baby tricycle is not folding collapsible, therefore the baby tricycle occupies much storage space during its delivery.

SUMMARY OF THE INVENTION

It is one object of the present invention to provide a baby tricycle, which is folding collapsible. It is another object of the present invention to provide a folding collapsible baby tricycle, which can conveniently be set between the operative position and the collapsed position simply by turning the saddle upwards or downwards. According to one aspect of the present invention, the baby tricycle comprises a head unit holding a pair of handlebars, a front wheel, and a pair of pedals; a body unit, the body unit comprising a seat frame, a saddle fixedly mounted on the seat frame, a rear wheel frame connected to the seat frame, a rear axle transversely connected to the rear wheel frame at a bottom side, and a pair of rear wheels mounted on two distal ends of the rear axle; and a folding collapsible connecting frame unit connected between the head unit and the rear wheel frame unit; wherein the seat frame comprises a pair of parallel lugs forwardly extended from a front end thereof, and a pair of pivot holes at a rear end thereof, the parallel lugs each having a pivot hole; the folding collapsible connecting frame unit comprises a front locating frame, a rear tubular connecting rod, and a link, the rear tubular connecting rod having a rear end welded to the rear wheel frame of the body unit, and a front end provided with a first pair of transversely aligned through holes and a second pair of transversely aligned through holes, the first pair of transversely aligned through holes of the rear tubular connecting rod being respectively and pivotably connected to the pivot holes at the rear end of the seat frame by a screw bolt and a nut, the front locating frame comprising a front end fixedly connected to the head unit, a first pair of pivot holes aligned at a rear end thereof remote from the head unit, and a backwardly extended coupling portion pivotably connected to the pivot holes at the lugs of the seat frame by a screw bolt and a nut, the link having a front end terminating in a first hooked portion hooked in the pivot holes at the rear end of the front locating frame, and a rear end terminating in a second hooked portion hooked in the second pair of transversely aligned through holes at the front end of the rear tubular connecting rod. According to another aspect of the present invention, the baby tricycle further comprises a spring having a front end connected to the rear end of the seat frame and a rear end inserted into the rear tubular connecting rod and connected to the second hooked portion of the link.

DETAILED DESCRIPTION OF THE PREFERRED EMBODIMENT

Figure 1:
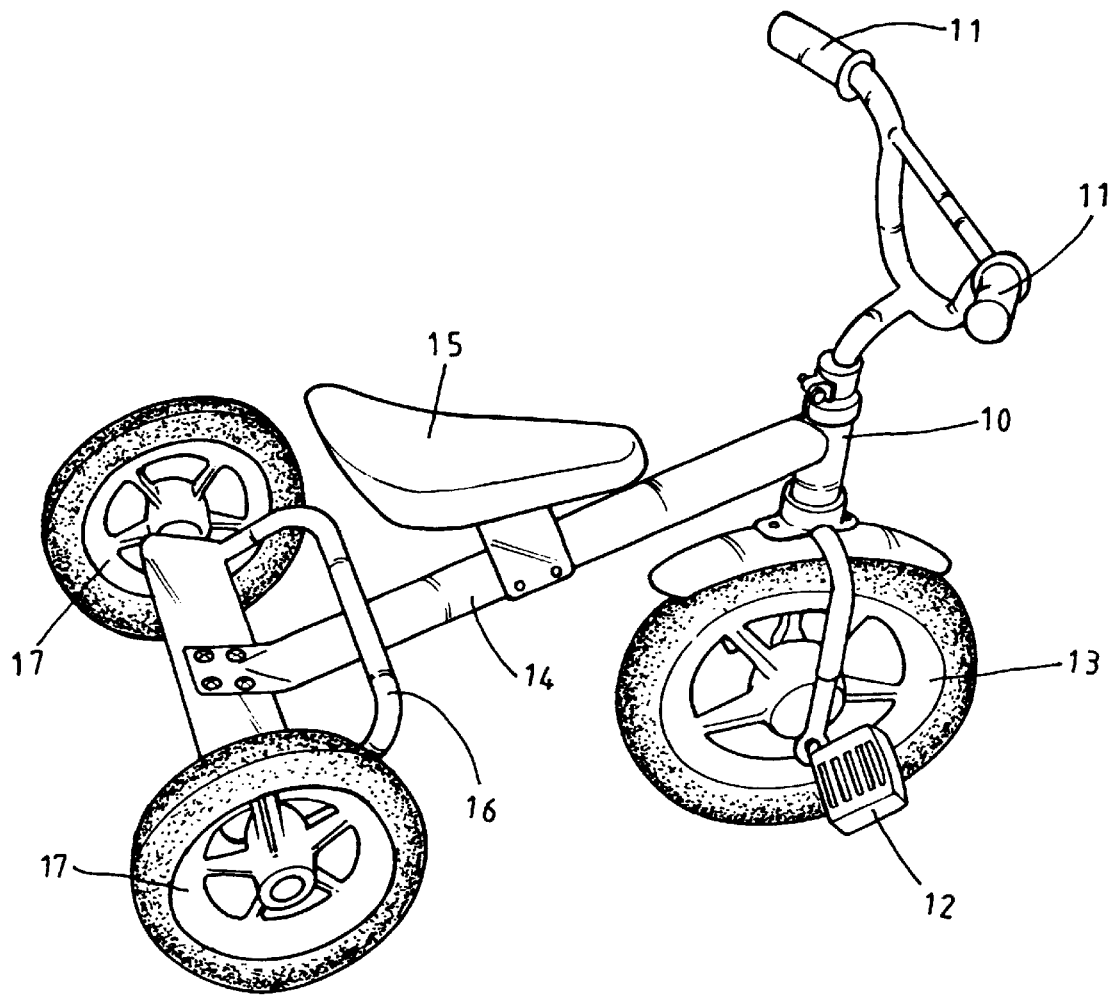
FIG. 1 is a perspective view of a baby tricycle according to the prior art.
Figure 2:
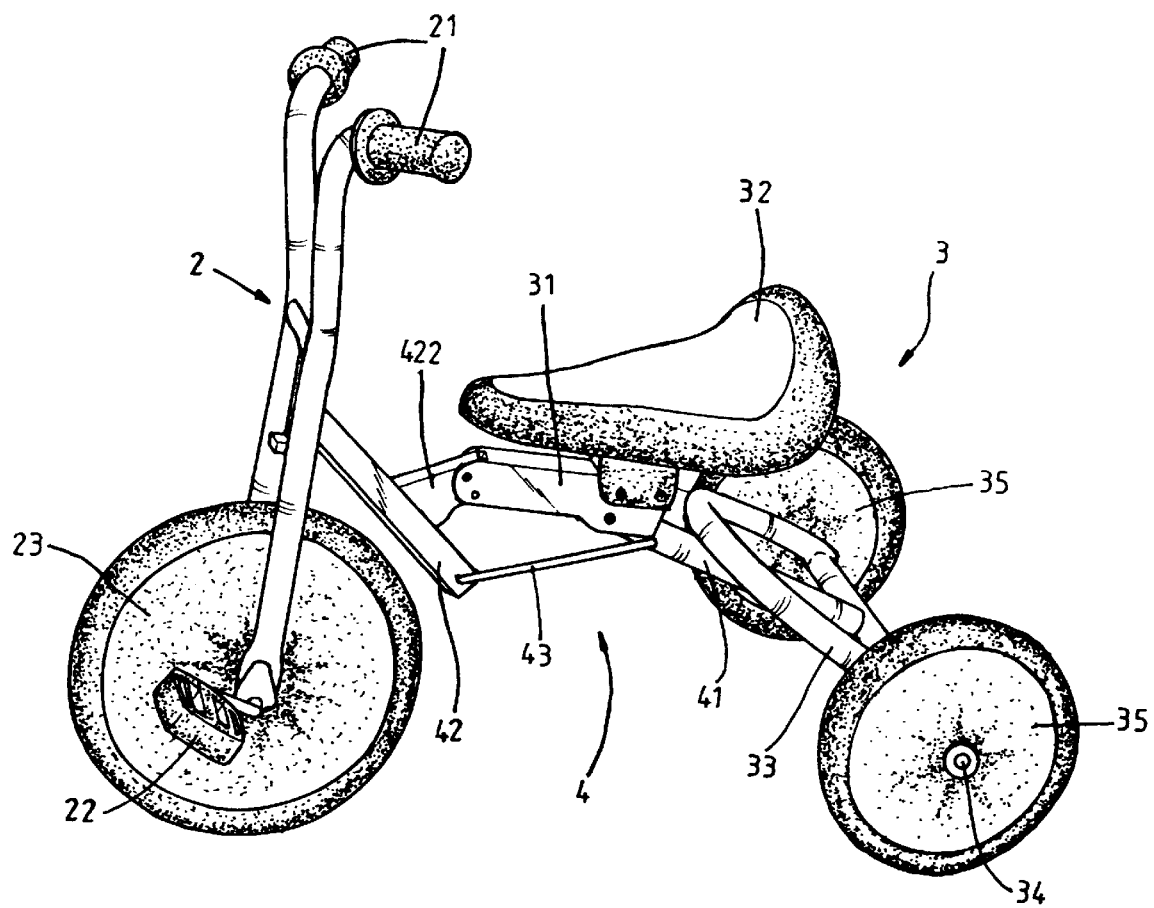
FIG. 2 is a perspective view of a folding collapsible baby tricycle according to the present invention.

Referring to FIG. 2, a baby tricycle is shown comprised of a head unit 2, a body unit 3, and a folding collapsible connecting frame unit 4 connected between the head unit 2 and the body unit 3. The head unit 2 comprises a pair of handlebars 21, a pair of pedals 22, and a front wheel 23. When riding the baby tricycle, the child holds the handlebars 21 with the hands, and pedals the pedal 22 with the feet, thereby causing the baby tricycle to move forwards. The body unit 3 comprises a seat frame 31, a saddle 32 mounted on the seat frame 31, a rear wheel frame 33 connected to the seat frame 31 and the head unit 2 by the folding collapsible connecting frame unit 4, a rear axle 34 transversely connected to the rear wheel frame 33 at a bottom side, and a pair of rear wheels 35 mounted on two distal ends of the rear axle 34. When pedaling the pedals 22, the front wheel 23 and the rear wheels 35 are rotated to move the baby tricycle forwards.

Figure 3:
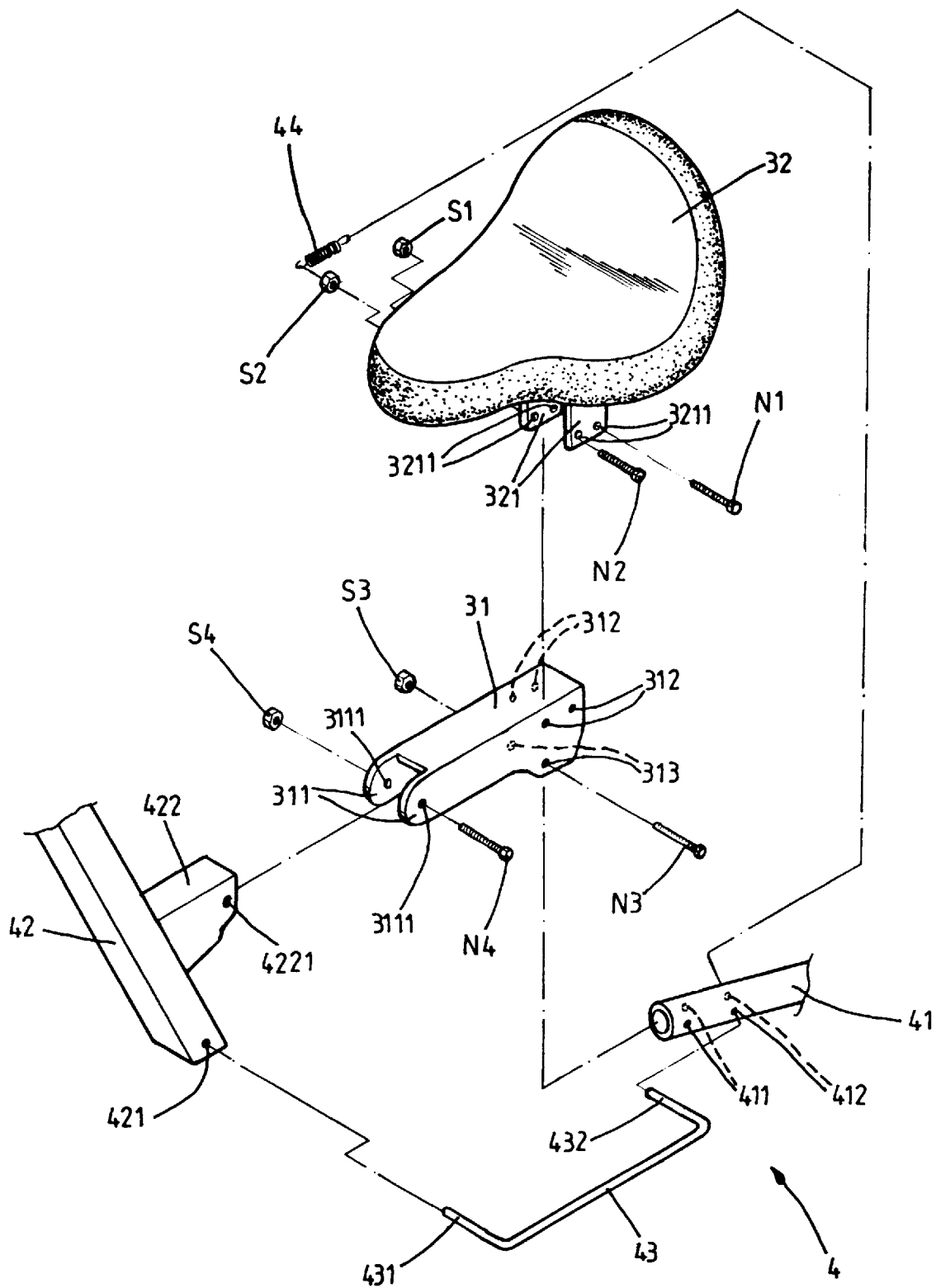
FIG. 3 is an exploded view of a part of the present invention.

Referring to FIG. 3 and FIG. 2 again, the folding collapsible connecting frame unit 4 comprises a rear tubular connecting rod 41, a front locating frame 42, and a link 43. The rear tubular connecting rod 41 has a rear end welded to the rear wheel frame 33, and a front end provided with a first pair of transversely aligned through holes 411 and a second pair of transversely aligned through holes 412. The seat frame 31 of the aforesaid body unit 3 comprises two parallel lugs 311 bilaterally forwardly extended from the front end thereof, two pairs of first mounting holes 312 a arranged near the rear end thereof at the top, and a pair of second mounting holes 313 arranged near the rear end at the bottom. The lugs 311 each have a mounting hole 3111. The saddle 32 of the aforesaid body unit 3 comprises two downwardly extended mounting frames 321 respectively attached to two opposite lateral side walls at the rear end of the seat frame 31. The mounting frames 321 each have two through holes 3211 corresponding to the first mounting holes 312 at the seat frame 31. First and second screws N1 and N2 are respectively mounted in the first mounting holes 312 at the seat frame 31 and the through holes 3211 at the mounting frames 321 of the saddle 32, and screwed up with first and second nuts 51 and 52 to fix the saddle 32 to the seat frame 31. The front locating frame 42 is fixedly connected to a middle part of the frame structure of the head unit 2, having a first pair of mounting holes 421 aligned at the rear end thereof remote from the head unit 2, a backwardly extended coupling portion 422, and a second pair of mounting holes 4221 aligned at the coupling portion 422. The link 43 has two hooked portions 431 and 432 at its two distal ends.

Figure 6:
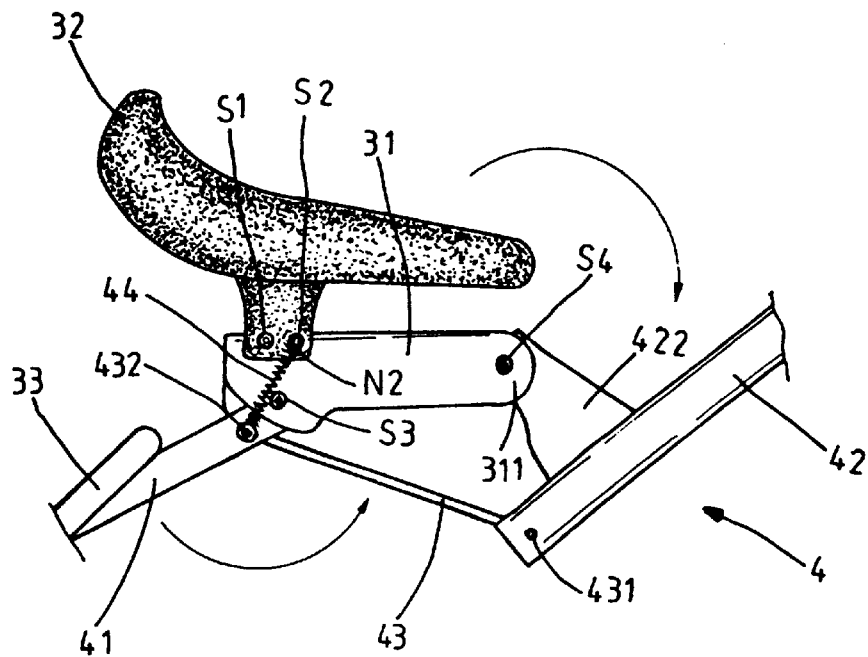
FIG. 6 is another side view of FIG. 4.
Figure 7:
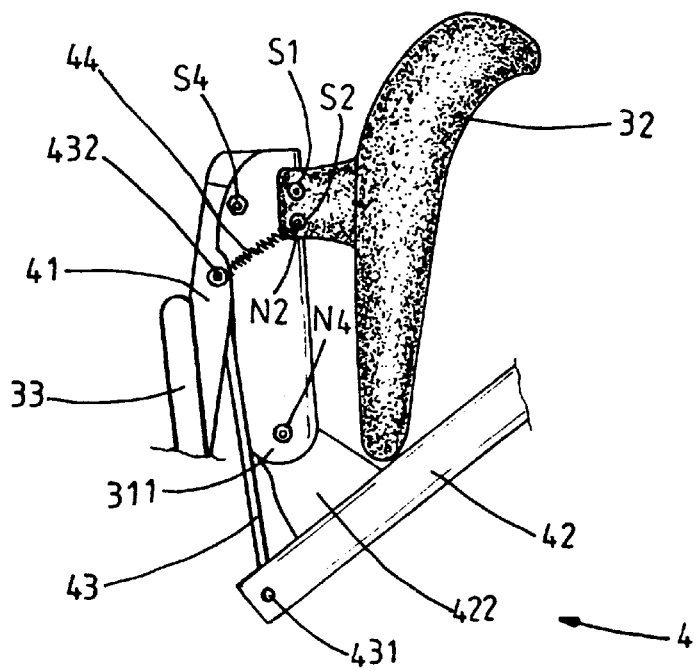
FIG. 7 is another side view of FIG. 5.
Figure 8:
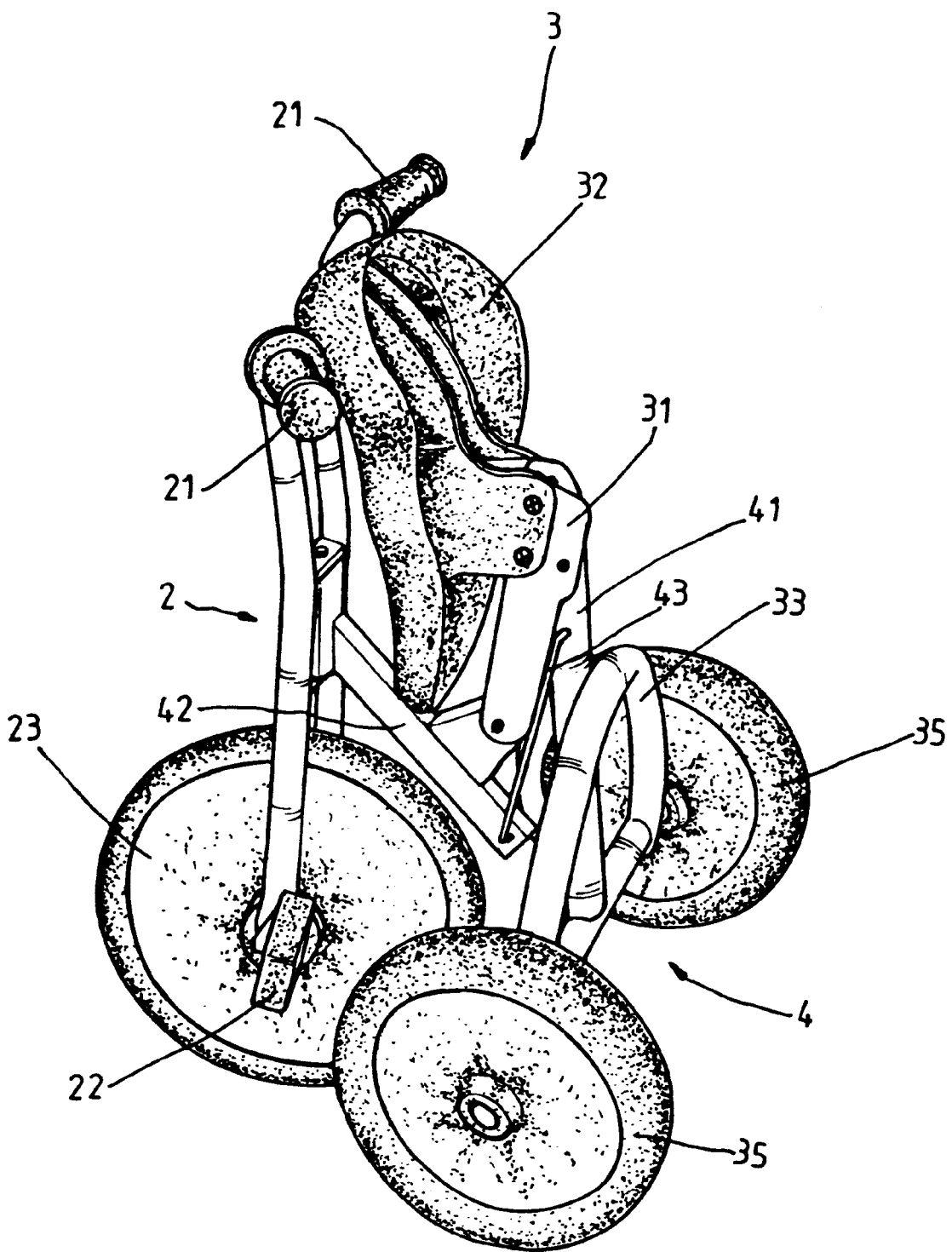
FIG. 8 illustrates the folding collapsible baby tricycle collapsed according to the present invention.

Referring to FIGS. 6 and 7 and FIGS. 2 and 3 again, the front end of the rear tubular mounting rod 41 is inserted into the rear end of the seat frame 31, then a third screw N3 is mounted in the first pair of transversely aligned through holes 411 at the rear tubular mounting rod 41 and the second mounting holes 313 at the seat frame 31 and screwed up with a third nut 53 to fix the rear tubular mounting rod 41 to the seat frame 31. The coupling portion 422 of the front locating frame 42 is then attached to the lugs 311 at the seat frame 31, and then a fourth screw S4 is mounted in the mounting holes 3111 at the lugs 311 and the mounting holes 4221 at the coupling portion 422 and screwed up with a fourth nut 54 to fix the seat frame 31 to the front locating frame 42. The link 43 is then coupled between the front locating frame 42 and the rear tubular connecting rod 41 by: hooking the hooked portion 431 in the mounting holes 421 at the front locating frame 42 and the hooked portion 432 in the mounting holes 411 at the rear tubular connecting rod 41. At final, a spring 44 is installed, and connected between the hooked portion 432 at the link 43 and the second screw N2 (see FIGS. 6 and 7), enabling the rear end of the seat frame 31 to be stopped at the link 43 (see FIG. 2).

Figure 4:
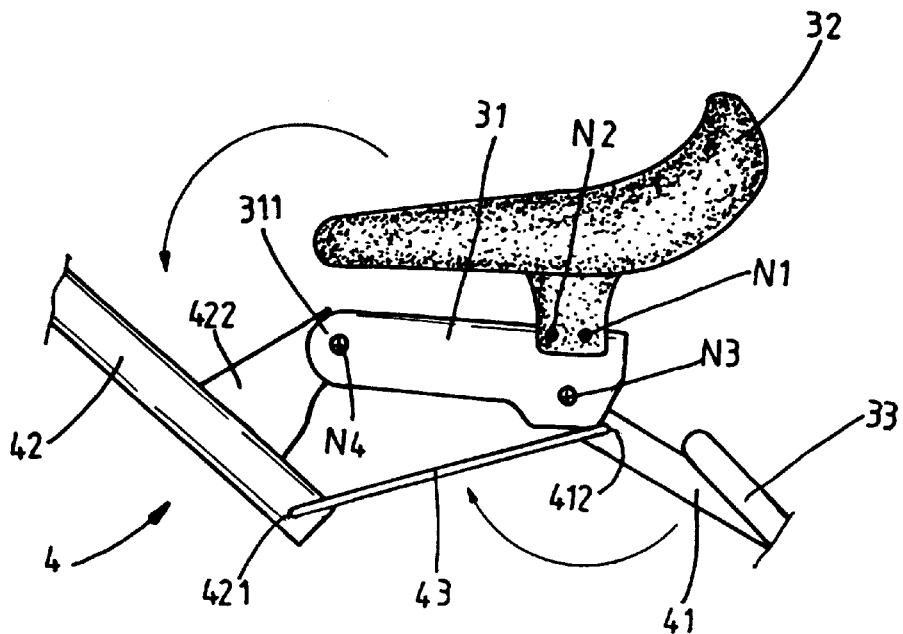
FIG. 4 is a side view of a part of the present invention, explaining the folding direction of the folding collapsible baby tricycle.
Figure 5:
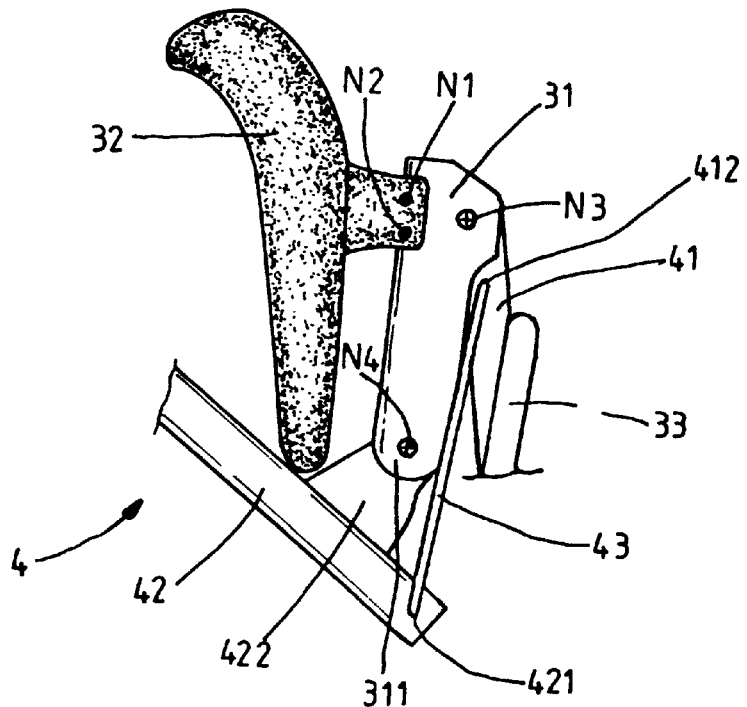
FIG. 5 illustrates the folding collapsible connecting frame folded up, the saddle stopped at the front locating frame according to the present invention.

When not in use, the front locating frame 42 is held down, and the saddle 32 is turned upwards and then forwards toward the front locating frame 42 from the extended (operative) position shown in FIGS. 4 and 6 to the collapsed position shown in FIG. 5 or 7 and stopped at the front locating frame 42, enabling the rear tubular connecting rod 41 to be turned about the third screw N3 to a vertical position and closely attached to the seat frame 31. When in use, the saddle 32 is turned backwards from the front locating frame 42, causing the link 43 and the rear tubular connecting rod 41 to be extended out from the front locating frame 43 from the collapsed position shown in FIGS. 5 and 7 to the extended (operative) position shown in FIGS. 4 and 6.

While only one embodiment of the present invention has been shown and described, it will be understood that various modifications and changes could be made thereunto without departing from the spirit and scope of the invention disclosed.

What the invention claimed is:

1. A baby tricycle comprising:

a head unit holding a pair of handlebars, a front wheel, and a pair of pedals;

a body unit, said body unit comprising a seat frame, a saddle fixedly mounted on said seat frame, a rear wheel frame connected to said seat frame, a rear axle transversely connected to said rear wheel frame at a bottom side, and a pair of rear wheels mounted on two distal ends of said rear axle; and a folding collapsible connecting frame unit connected between said head unit and said rear wheel frame unit;

wherein said seat frame comprises a pair of parallel lugs forwardly extended from a front end thereof, and a pair of pivot holes at a rear end thereof, said parallel lugs each having a pivot hole;

said folding collapsible connecting frame unit comprises a front locating frame, a rear tubular connecting rod, and a link, said rear tubular connecting rod having a rear end welded to said rear wheel frame of said body unit, and a front end provided with a first pair of transversely aligned through holes and a second pair of transversely aligned through holes, the first pair of transversely aligned through holes of said rear tubular connecting rod being respectively and pivotably connected to the pivot holes at the rear end of said seat frame by a screw bolt and a nut, said front locating frame comprising a front end fixedly connected to said head unit, a first pair of pivot holes aligned at a rear end thereof remote from said head unit, and a backwardly extended coupling portion pivotably connected to the pivot holes at the lugs of said seat frame by a screw bolt and a nut, said link having a front end terminating in a first hooked portion hooked in the pivot holes at the rear end of said front locating frame, and a rear end terminating in a second hooked portion hooked in the second pair of transversely aligned through holes at the front end of said rear tubular connecting rod.

2. The baby tricycle of claim 1 further comprising a spring having a front end connected to the rear end of said seat frame and a rear end inserted into said rear tubular connecting rod and connected to the second hooked portion of said link.

* * * * *